3,308,071
METHOD OF PREPARING A SUPPORTED
NICKEL CATALYST
Peter Thomas White, Sunbury-on-Thames, England, assignor to The British Petroleum Company Limited, London, England, a British joint-stock corporation
No Drawing. Continuation of application Ser. No. 103,981, Apr. 19, 1961. This application June 19, 1963, Ser. No. 288,865
Claims priority, application Great Britain, May 4, 1960, 15,757/60
6 Claims. (Cl. 252—457)

This application is a continuation of my application, Serial No. 103,981, filed April 19, 1961, now abandoned.

This invention relates to the preparation of extruded catalysts, particularly catalysts comprising catalytic material supported on a carrier.

The formation of catalysts by extrusion, that is by forcing a slurry of material through a nozzle, cutting the extruded filament into pieces of suitable length and drying the extrudates thus formed is known and is a particularly suitable method for preparing catalysts for use in fixed beds. The material to be extruded may consist of carrier material only, or both carrier and catalytic material. If it consists of carrier material only, the catalytic material is added at a later stage, preferably after drying.

There are a large number of factors which may affect the physical characteristics of the extrudate, including for example, the size of the particles in the slurry, the amount of the slurrying liquid, which is usually water, the pressure at which the slurry is forced through the nozzle, the temperature and the rate of drying of the extrudate, the humidity during drying, and the length of time between the drying and the calcination of the extrudate. Variation of the physical characteristics will in their turn affect the activity of the catalyst.

In addition if the catalyst comprises nickel supported on a carrier there are further factors which may affect the activity. In particular when preparing catalysts of reduced nickel from nickel formate, the nickel formate is reduced directly to nickel according to the equation, $$Ni(COOH)_2 = Ni + CO + CO_2 + H_2O$$

Of the gaseous reaction products, both carbon monoxide and water vapour are known to react with elemental nickel to give, respectively, nickel carbonyl and nickel oxide both of which may be undesirable in the finished catalyst. Anything which impedes the removal of the gaseous reaction products or tends to increase the reaction of the elemental nickel with them, therefore, may also adversely affect catalyst activity.

It follows that an accurate forecast of catalyst activity may be difficult and that different batches of catalyst although of identical appearance may have very different activities. A simple method of improving catalyst activity is, therefore, desirable both for further improving catalysts of good to moderate activity and also for rendering catalysts of low activity usable.

It has now been found that, although it may not be apparent visually, the activity of extruded catalysts is effected by the form of the surface of the catalysts. According to the present invention, therefore, a method of preparing extruded catalysts composed of catalytic material supported on a carrier and which require activation before use comprises subjecting the dried extrudates, before the activation, to attrition to remove a small proportion, preferably less than one percent by weight of total catalyst, of the extrudate exterior.

The reason why a surface skin should be formed on certain extruded catalysts, how precisely this skin affects the activity or why it should be purely a surface phenomenon is not completely understood. However it has been found that removal of quite small amounts of the exterior can affect the catalyst activity considerably. The amount to be removed will depend on the particular catalyst and may be determined by experiment, but, as stated above, it may be less than 1% wt. of total catalyst. The minimum removal may be 0.2% wt. and a particularly preferred range is 0.2–0.5% wt.

The stage in the catalyst preparation at which the attrition is given will depend on the particular type of catalyst used. As stated above, it should be given after drying of the extrudate, but, if desired, the catalyst may also be calcined before being subjected to attrition. Where only the carrier is extruded, it is preferable to carry out the attrition after the impregnation of the carrier with catalyst material, since it is possible that the formation of the surface skin may be in some way connected with the impregnation. As stated above, the catalytic material requires to be activated by decomposition before use and it is necessary to carry out the attrition before such treatment. One reason for this is that it is possible that one of the factors affecting activity is the lack of freedom of gases involved in the decomposition to pass through the surface skin. Other reasons include the fact that elemental nickel catalysts are highly reactive, and that the activation is not normally carried out until the catalyst has been loaded into the reactor in which it is to be used.

The actual method of attrition is not critical provided it removes the required amount of catalyst without otherwise damaging or disintegrating the extrudates. A suitable method is to tumble the extrudates so that the extrudate exterior is removed by contact between the extrudate pieces. A rotating drum partially filled with the extrudate pieces may conveniently be used.

The process of the present invention is particularly suitable for improving the activity of catalysts of nickel supported on a carrier. These catalysts may be prepared by impregnating the carrier with a nickel salt for example nickel nitrate or acetate followed by reduction of the salt to activate the catalyst. In the case of salts such as the nitrate or acetate the activation may be in two stages, first the conversion of the salt to nickel oxide by calcination followed by reduction of the oxide in a stream of hydrogen or hydrogen-containing gas at 150–600° C. The preferred salt is, however, nickel formate which may be either mechanically mixed with a carrier or, preferably, dissolved in an aqueous ammoniacal solution and added to the carrier by impregnation. The advantage of this method of preparation is that a salt such as nickel formate reduces directly to nickel, (without going through the oxide state) in a non-oxidising atmosphere, for example in an inert gas stream at a temperature of 150° to 300° C., preferably about 250° C. As described in United States Patent 3,098,829 granted on July 23, 1963, although the temperature of 150–300° C. has been normally considered adequate, higher temperatures may also be used with beneficial results.

After the reduction, the nickel catalyst should not be allowed to come into contact with air or spontaneous oxidation of the nickel to nickel oxide may occur.

Preferably the catalyst contains from 1 to 50% of nickel (expressed as elemental nickel) by weight of total catalyst, and more particularly from 5 to 15% wt.

The process of the present invention is suitable for catalysts having a carrier for the catalytic material, for example a refractory oxide such as alumina, a clay mineral or a siliceous material such as kiselguhr. It is, however, particularly suitable for catalysts having a carrier of sepiolite, for example as disclosed in United States Patent No. 3,004,914, granted October 17, 1961. Sepiolite is a commercially available clay mineral which occurs naturally and which can also be prepared synthetically. It has the ideal formula $H_4Mg_9Si_{12}O_{30}(OH)_{10}$ and is also known as Meerschaum. It has been found that problems of catalyst activity occur particularly with extruded catalysts using sepiolite as the carrier.

The process of the present invention is particularly suitable for increasing the activity of catalysts of low activity. The degree of activity required will depend on the catalyst and the process for which it is to be used and will normally be measured by a comparative test. For example, with the preferred catalysts of reduced nickel on a carrier such as sepiolite the catalyst may be tested for hydrogenation activity by passing over it, under standard conditions, an unsaturated feedstock and hydrogen and measuring the hydrogen absorbed. When processing a feedstock having a specific gravity at 60° F./60° F. within the range 0.70 to 0.80 under the process conditions set out in Example 1 hereafter a criterion of satisfactory activity is a hydrogen consumption of at least 100 s.c.f./b. and preferably at least 150 s.c.f./b. A hydrogen consumption of less than 100 s.c.f./b. is a low activity. These preferred catalysts may be used for hydrogenation reactions generally, but are particularly suitable for reducing the gum-forming tendency of gasolines produced by high temperature thermal cracking processes. These processes which use temperatures of 460° to 900° C. preferably 600–900° C., besides producing large quantities of unsaturated normally-gaseous hydrocarbons, may also produce gasoline fractions of high octane number but which tend to form gum possibly due to the presence of styrene, cyclopentadiene and other conjugated dienes. It is desirable to selectively hydrogenate these gum forming hydrocarbons without hydrogenating appreciable amounts of aromatics and mono-olefins, which contribute to the high octane number. The gasolines may also contain small amounts of sulphur, for example from 0.005 to 0.04% wt., but it has been found that, in contradistinction to gasolines produced by catalytic cracking, the sulphur is present largely as thiophenes and not mercaptans and does not adversely affect the activity of the reduced nickel. A typical gasoline feedstock is steam cracker gasoline which is defined as a gasoline produced by cracking a petroleum distillation at 600° to 900° C. in the presence of steam.

The hydrogenation will be carried out in the presence of a hydrogen-containing gas. Suitable gas mixtures are mixtures of hydrogen with normally gaseous hydrocarbons, for example a platformer tail gas. Suitably a gas is employed containing 70 mol percent of hydrogen. A typical gas will consist of 70 mol percent of hydrogen and 30 mol percent of $C_1$ to $C_4$ paraffins. Other suitable gases are steam cracker tail gas, catalytic cracker tail gas and tail gas derived from dehydrogenation of hydrocarbons.

Preferably the severity of the conditions of hydrogenation is selected to provide a high percentage conversion of any di-olefins present to mono-olefins and to saturate the alkyl side chains of any styrenes present. As is well known in the art, severity of hydrogenation can be increased by raising the hydrogen partial pressure, raising the reaction temperature, increasing the hydrogen/feedstock ratio or decreasing the flow rate.

The hydrogen consumption per unit weight of feedstock is a measure of the degree of saturation of the di-olefins and styrenes, and hence the degree of improvement in the gum stability of the gasoline. Preferably the hydrogen consumption is at least 60 s.c.f./b., and more particularly at least 120 s.c.f./b., and it may be more than 150 s.c.f./b. The upper limit of hydrogen consumption will be determined by the undesirability of substantially reducing the octane number of the gasoline by hydrogenation of mono-olefins. In practice a hydrogen consumption of less than 250 s.c.f./b. should be suitable. Preferably, the research octane number (with 1.5 ml. TEL/IG) of the gasoline product is not more than one octane number below the research octane number of the similarly leaded feedstock. Leaded research octane numbers are preferred as a basis for comparison since while there may be some slight drop in research octane numbers (clear) as between feed and product, this is offset by an increased lead response in the product.

A further reason for limiting the hydrogen consumption is that increased hydrogen consumption requires a higher operating temperature which will reduce the life of the catalyst.

Suitable hydrogenation conditions may be:

Temperature _____° C__ [1] 0 to 200
Pressure _____p.s.i.g__ [2] 0 to 1000
Gas recycle rate (recycle or once through) _____s.c.f./b. of hydrogen__ 300 to 2000
Space velocity _____v./v./hr__ [3] 0.5 to 10

[1] Preferably 80 to 180° C.
[2] Preferably 200–500 p.s.i.g.
[3] Preferably about 2 v./v./hr.

The treated gasoline may be stabilised to give a product of low $C_4$ content and may also be re-run to remove a small proportion for example 6% wt. or less, of heavy ends. Re-running at a maximum temperature of not more than 250° C., and preferably not more than 205° C., may be advisable, since high re-running temperatures can adversely affect gum stability.

Suitable tests which give a measure of the gum stability of gasolines during storage or in an engine are the Induction Period test (ASTM Method D525–55), the Accelerated Gum Test (D873–49), and the Existent Gum (ASTM Method D381–57).

The invention is illustrated by the following examples:

*Example 1*

Sepiolite extrusions were made by forcing a sepiolite slurry through a nozzle, cutting the extrusions formed, and drying the pieces. These dried pieces were calcined at 550° C. and then impregnated with a nickel amine formate solution containing about 11.5 wt. of nickel and dried at a temperature of 100° C. for 16 hours.

The nickel formate was reduced to nickel by passing a stream of hydrogen over the catalyst for 4 hours. The temperature was 250° C., the pressure atmospheric and the space velocity 100 volumes of hydrogen/vol. of catalyst/hr. The nickel content of the catalyst was 10% wt.

After reduction of the nickel formate to nickel the activity of the catalyst was measured by passing hydrogen along with a standardised steam cracker gasoline feedstock over a bed of catalyst. The unreacted hydrogen, which was separated from the steam cracker gasoline in a high pressure separator, was metered as it left the apparatus.

The amount of hydrogen taken up by the steam cracker gasoline under the conditions of test was the catalyst activity. The conditions of test are given below.

Steam cracker gasoline feed rate, ml./hr__ 240
Volume of catalyst _____ml__ 120
Hydrogen inlet rate 1/hr. at STP _____ 32.5
Reactor pressure _____p.s.i.g__ 200
Catalyst bed temperature _____° C__ 100
Duration of test _____hours__ 14

Inspection data on the feedstock were as follows:

| | | |
|---|---|---|
| Specific gravity at 60° F./60° F. | | 0.7793 |
| ASTM distillation: | | |
| IBP | °C | 42 |
| Percent volume recovered at— | | |
| 2 | °C | 47.5 |
| 5 | °C | 55.4 |
| 10 | °C | 61 |
| 20 | °C | 71.5 |
| 30 | °C | 81.5 |
| 40 | °C | 93 |
| 50 | °C | 104.5 |
| 60 | °C | 114 |
| 70 | °C | 123 |
| 80 | °C | 137 |
| 90 | °C | 165 |
| FBP | °C | 213 |
| Recovery | Percent volume | 98 |
| Residue | do | 1.2 |
| Loss | do | 0.8 |
| Recovered at 70° C. | do | 18.5 |
| Recovered at 100° C. | do | 46.5 |
| Recovered at 140° C. | do | 82 |
| Total sulphur | Percent weight | 0.014 |
| Diene index | | 4.01 |
| Styrene correction | | 1.58 |
| Bromine No. | | 70.7 |
| Aromatics ASTM | Percent weight | 22.5 |

The catalyst activity was 76 s.c.f. of hydrogen/b.

A further portion of the nickel formate on sepiolite composite was then tumbled in a rotating drum for two hours until 0.22% wt. of the composite was removed. The composite was then activated by reducing the nickel formate to nickel in the same way as the previously mentioned composite, and tested for activity also in the same way. The hydrogen absorption was 232 s.c.f./b.

*Example 2*

Example 1 was repeated on a different batch of catalyst which had an activity of 61 s.c.f./b. After tumbling the nickel formate on sepiolite composite for one hour in a rotary drum to remove 0.45% wt. of the composite, activating the composite, and retesting, the catalyst activity increased to 218 s.c.f./b.

I claim:

1. A method of preparing extruded catalysts composed of nickel supported on a carrier, in which the nickel content is from 1% to 50% of nickel, expressed as elemental nickel, by weight of total catalyst which catalysts require activation by decomposition of a nickel compound to elemental nickel, comprising, forming an extrudate of said nickel compound and carrier, drying the extrudate, and thereafter, before the activation, subjecting the extrudate to attrition to remove from 0.2 to 1% wt., by weight of total catalyst, of the extrudate exterior.

2. A method as claimed in claim 1 wherein from 0.2 to 0.5% wt. by weight of total catalyst is removed.

3. A method as claimed in claim 1 wherein the catalyst contains from 5 to 15% of nickel, expressed as elemental nickel, by weight of total catalyst.

4. A method as claimed in claim 1 wherein the nickel compound is nickel formate.

5. A method as claimed in claim 1, wherein the carrier is sepiolite.

6. A method as claimed in claim 1, wherein the attrition is carried out by tumbling the extrudates.

References Cited by the Examiner

UNITED STATES PATENTS 3,041,385  6/1962  Bourne et al. _____ 252—459 X
3,098,829  7/1963  White et al. _____ 252—466

OSCAR R. VERTIZ, *Primary Examiner.*

E. J. MEROS, *Assistant Examiner.*